United States Patent [19]

Peyre et al.

[11] Patent Number: 5,423,233
[45] Date of Patent: Jun. 13, 1995

[54] DEVICE FOR ATTACHING A SHOE ON A BICYCLE

[75] Inventors: Henri Peyre, St. Benin d'Azy; Daniel Bontemps; Hugues Baume, both of Nevers, all of France

[73] Assignee: Look S.A., Nevers, France

[21] Appl. No.: 15,700

[22] Filed: Feb. 9, 1993

[30] Foreign Application Priority Data

Feb. 27, 1992 [DE] Germany .................. 42 06 106.7

[51] Int. Cl.$^6$ ............................................. G05G 1/14
[52] U.S. Cl. .............................. 74/594.6; 74/594.4; 36/131
[58] Field of Search ................. 74/594.4, 594.6; 36/131, 132

[56] References Cited

U.S. PATENT DOCUMENTS

| | | | |
|---|---|---|---|
| 4,932,287 | 6/1990 | Ramos | 36/131 X |
| 5,003,841 | 4/1991 | Nagano | 74/594.4 |
| 5,115,692 | 5/1992 | Nagano | 74/594.6 X |
| 5,203,229 | 4/1993 | Chen | 74/594.4 X |
| 5,259,270 | 11/1993 | Lin | 74/594.6 |

FOREIGN PATENT DOCUMENTS

| | | | |
|---|---|---|---|
| 0058438 | 8/1982 | European Pat. Off. | 74/594.6 |
| 0146454 | 6/1985 | European Pat. Off. | 74/594.6 |
| 0372165 | 6/1990 | European Pat. Off. | 74/594.6 |
| 0428140A1 | 5/1991 | European Pat. Off. | 74/594.6 |
| 0485956 | 5/1992 | European Pat. Off. | 74/594.6 |
| 2644129 | 9/1990 | France | 74/594.6 |
| 2663604 | 12/1991 | France | 74/594.6 |
| 99601 | 1/1898 | Germany | 74/594.6 |
| 105471 | 7/1898 | Germany | 74/594.6 |
| 3937208 | 5/1990 | Germany | 74/594.6 |
| 8818063 U | 7/1992 | Germany | 74/594.6 |
| 4-372486 | 12/1992 | Japan | 74/594.6 |

Primary Examiner—Vinh T. Luong
Attorney, Agent, or Firm—Townsend and Townsend Khourie and Crew

[57] ABSTRACT

A device for attaching a shoe to a bicycle pedal comprises a plate (23), adapted for mounting onto a sole of the shoe, and a pedal body (1). The pedal body has first and second stepping surfaces (A, B) on opposing sides and front and rear anchor members (5A, 5B, 31A, 31B) adapted to cooperate with front and rear portions of the plate. The rear anchor members each have a lever that is pivotable about a transverse axis between an anchor position, where the rear anchor members are configured to affix the plate to the stepping surfaces, and a release position, where the rear anchor members are configured to release the plate. A common return device (55) creates a single, adjustable biasing force to bias both levers into the anchor position.

13 Claims, 7 Drawing Sheets

DEVICE FOR ATTACHING A SHOE ON A BICYCLE

BACKGROUND OF THE INVENTION

The invention relates to a device for attaching a shoe on a bicycle pedal, comprising a plate which can be mounted on the sole of the shoe, the front portion of the plate, as viewed in the travel direction, cooperating with a front anchor member and the rear portion of the plate, as seen in the travel direction, cooperating with a rear anchor member of the pedal body, wherein the rear anchor member comprises a lever tiltable about a transverse axis, with this lever being urged into its anchoring position by means of a return device.

In a device of the kind described above and known from EP 0 146 454 A2, anchor members are provided only on one of the sides of the pedal which serves as a stepping surface. Thus, when a shoe is to be attached by means of its plate to the considered pedal, this pedal must occupy a defined pivotal position in which the pedal side provided with the anchor members is directed upwardly.

The object of the invention is to realize a further device for attaching a shoe on a bicycle pedal of the kind mentioned at the beginning. With a simple construction and a problem-free manipulation it should in particular be attained that the shoe can be attached on the two main faces of the pedal. The release characteristic should remain as constant as possible irrespective of the side on which the shoe is attached.

SUMMARY OF THE INVENTION

In accordance with the invention, this problem is solved in that a front anchor member and a rear anchor member are respectively provided on the two main surfaces of the pedal body which both serve as stepping surfaces; and in that the return device is arranged between two levers which are associated to the rear anchor members. Owing to this construction, a substantially simpler engagement into the pedal is achieved due to the fact that the respective attachment can be carried out on any main face. Owing to the return device acting in the same manner on the two rear anchor members arranged on the different main faces it is also ensured that the desired release characteristic is maintained in any case or that this release characteristic does not depend on which side of the pedal the particular shoe is attached.

An embodiment of particularly simple and rugged construction of the return device comprises two pistons guided in the pedal body and biasing one respective of the two levers, as well as a pressure spring arranged between these pistons. Since the two pistons are held by the pressure spring interposed between them against the two rear anchor members realized in the manner of levers and arranged on the different main faces of the pedal, in case of a given rotation of the plate in the release direction it always results a corresponding compression of the spring and thus a corresponding return force irrespective of which piston has been loaded by the plate at the shoe side.

If the return device which acts simultaneously onto the two levers is adjustable in respect of its return force which is equal for the two levers, a respective modification of the return force acts in the same manner on the two levers. Therefore, the release characteristic can be adjusted simultaneously for the two main sides of the pedal.

In a practically preferred embodiment of a return device with adjustable return force, the return device can be adjusted by means of an adjustment screw connected to one of the two pistons and supporting the considered end of the pressure spring.

In accordance with one embodiment, the front anchor members also comprise each a lever mounted on the pedal body for rotation about the transverse axis and urged into its anchoring position by means of the return device. Thus, the front anchor members are also pivotable respectively about a transverse axis against a return force produced by the return device, whereby the engagement into the pedal is in particular substantially simplified.

In embodiment of particularly simple construction in which the lever-like front and rear anchor members provided at one respective end of the pedal body are gathered into a two-armed lever, a common, preferably double armed lever is associated to each of the front and rear anchor members which are provided on the different main faces and are mounted on a respective end of the pedal body.

In a further embodiment, the front and rear anchor members or the front and rear levers which constitute them, are urged by means of cams having different profiles, and these profiles are differently selected such that in respect of the action of the return device on the cam associated to the front anchor member the relatively shorter lever arm results. Owing to this embodiment one obtains that when using one and the same return device the return force for the front anchor member is lower than that for the rear anchor member, which simplifies in particular such an engagement into the pedal in which the lever-like anchor member is firstly pivoted outwardly on applying the shoe and snaps back thereafter for anchoring the front portion of the plate.

In another embodiment, on each of the two main faces of the pedal body provision is made for at least two front abutments which cooperate with a semi-circular front support surface of the plate as well as a rear abutment which cooperates with a curved rear support surface of the plate; and in that the rear portion of the plate preferably comprises two control surfaces which are inclined towards each other and which cooperate with correspondingly inclined control surfaces of the rear anchor member in order to rotate the latter against the return force about a vertical axis defined by the semi-circular front support surface on a relative rotation of the plate. This configuration ensures that a release can only occur during the course of a relative rotation of the plate about a vertical axis extending perpendicular to the considered main side of the pedal. When the plate is anchored to the pedal a pivoting of this plate about a transverse axis is excluded.

In a further embodiment of particularly simple construction, which involves in particular a lower number of abutments, both the front and the rear portions of the plate comprise two control surfaces inclined towards each other, which cooperate with correspondingly inclined control surfaces of the front of rear lever shaped anchor member; and in that the front control surfaces are inclined at an angle relative to the longitudinal direction which is smaller than the considered angle for the rear control surfaces. Since the front control surfaces are inclined with respect to the longitudinal direction at an angle lower than the corresponding angle for the rear control surfaces, it is ensured that during the rotation of the plate caused for example by a corresponding rotation of the foot the rear lever is pivoted faster than the front lever such that the plate is released at the back also in this case. The previous release characteristic is maintained.

In still another embodiment, on each of the two main faces of the pedal body provision is made for at least two front abutments which cooperate with a semi-circular front support surface of the plate, and two rear abutments which cooperate respectively with one of two rear projections of the plate arranged so as to form a V; and in that the cut-out which results between the two rear projections is bounded laterally by two control surfaces of the plate, which are inclined towards each other and spread apart rearwardly in a V-shape, and which cooperate with correspondingly inclined control surfaces of the rear anchor member said control surfaces being provided outwardly on a projection of the rear anchor member which projects into the cut-out. This variant differs substantially in that two rear abutments are provided instead of one rear abutment and the cut-out delimited by the control surfaces is in particular provided on the plate and no longer on the rear anchor member. This cut-out forms an accommodation space for a projection of the rear anchor member which carries the complementary control surfaces. Accordingly, during a return caused by the spring, this anchor member penetrates by means of the projection relatively far into the plate, whereby the engagement or stepping in is simplified in such cases in which the shoes are covered with mud or dirt.

BRIEF DESCRIPTION OF THE DRAWINGS

The invention will be thereafter described in more detail in connection with examples of embodiments and with reference to the drawings; the latter show.

DESCRIPTION OF SPECIFIC EMBODIMENTS

Figure 7A:
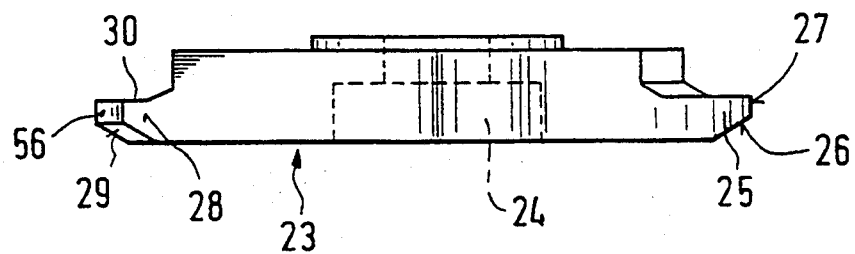
Figure 7B:
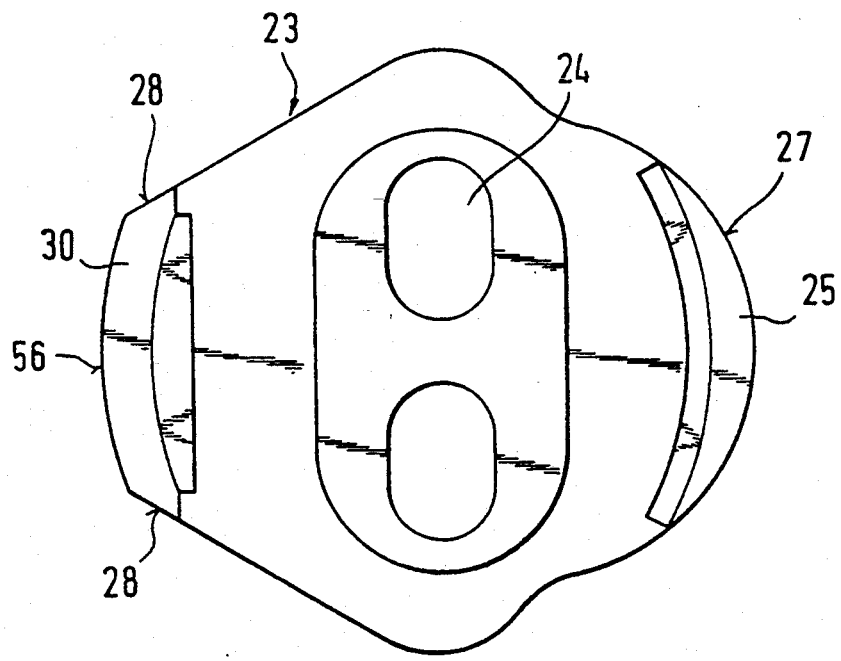

A first example of embodiment of a device for attaching a shoe on a bicycle pedal is shown in FIGS. 1 to 4 and 7. FIG. 7 shows a plate 23 which can be mounted from below on the sole of a shoe, by means of which the shoe can be attached to the pedal body 1 (see for example FIGS. 1, 3 and 4).

The plate 23 comprises a front portion 25 as viewed in the travel direction F, provided with a front, circular shaped support surface 27 and a lower, inclined control surface 26 for facilitating the application of the plate 23 onto the pedal body 1 and a rear portion 30, as viewed in the travel direction F, having a curved rear support surface 56 and a lower inclined control surface 29 to facilitate the application of the plate 23 onto the pedal body 1. This plate 23 can be attached on the considered shoe for example by means of screws and intermediate disks for example at locations 24.

Flat control surfaces 28 inclined laterally towards each other are provided on the rear portion 30 of the plate 23. The control surfaces extend jointly rearwardly, i.e. opposite to the travel direction F, in a V-shape.

The pedal body 1 is connected to a shaft O by means of which the bicycle pedal can be pivotally mounted on the associated crank of the pedal.

The front portion 25 of the plate 23 cooperates with a front anchor member 31A of the pedal body 1, as viewed in the travel direction F. The rear portion 30 of the plate 23 cooperates correspondingly with a rear anchor member 5A of the pedal body 1.

The rear anchor member 5A is formed by a lever having a hook-like extension at the upper end, which is journalled about a transverse axis 4 on the pedal body 1. In the same manner, the front anchor member 31A is formed by a lever having a hook-like extension at the upper end, which is also journalled about a transverse axis 4 on the pedal body 1.

Figure 2:
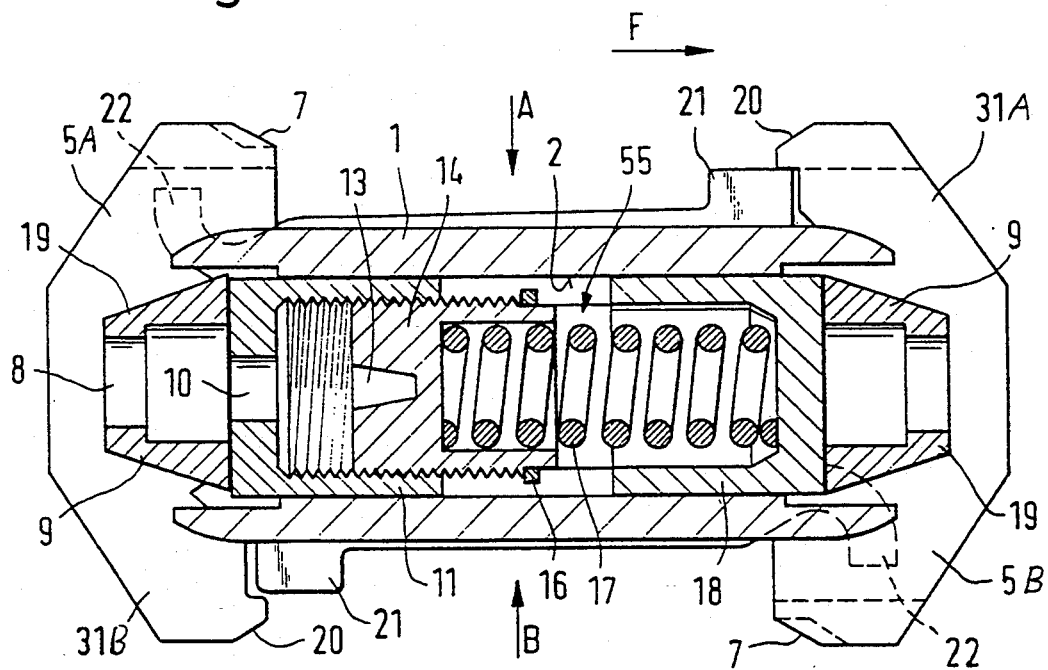
Figure 3:
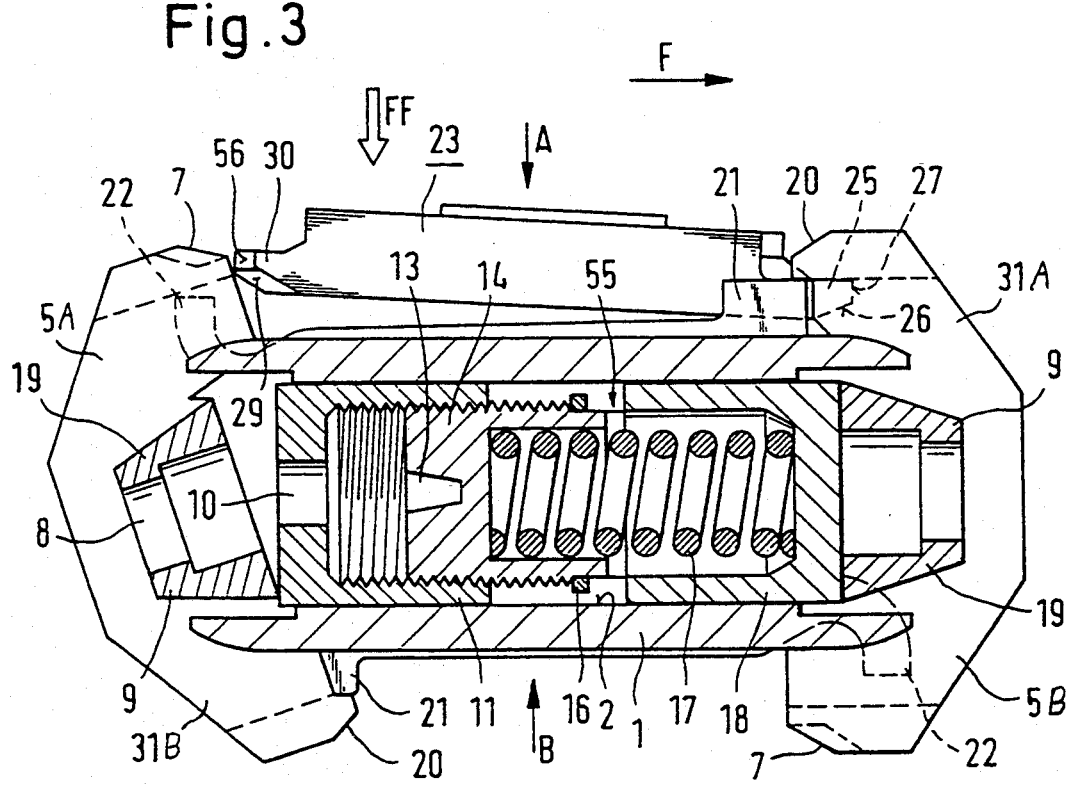
Figure 4:
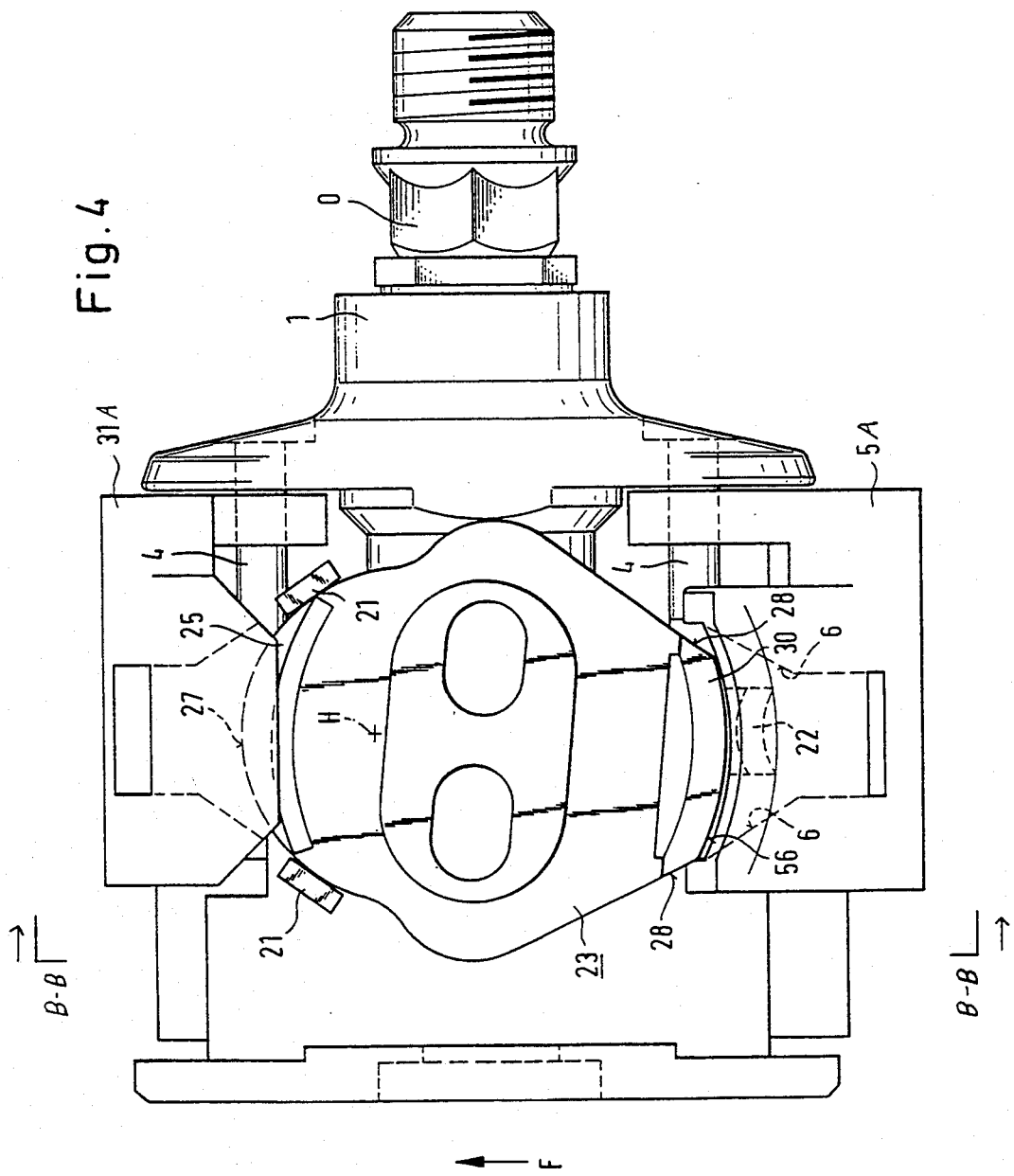

Such lever-like anchor members 5A, 31A are provided not only on one main face of the pedal body 1 but, as it can be seen for example in FIGS. 2 and 3, on the two main faces A, B of the pedal body 1 which can serve as stepping surfaces. The bottom front and rear anchor members are denoted 31B and 5B, respectively. Note that the invention will be primarily described in reference to one of the front and rear anchor members denoted generally as 31 and 5, respectively. The front anchor members 31 on the one hand and the rear anchor members 5 on the other hand, which are provided on the different main faces A, B, are located respectively diagonally opposite to each other. As rear anchor member is considered the anchor member which comes into engagement with the plate 23 and lies simultaneously behind when considered in the travel direction. Correspondingly, it should be understood that the front anchor members are those members which come into engagement with the plate 23 and lie forwardly when considered in the travel direction.

Figure 1:
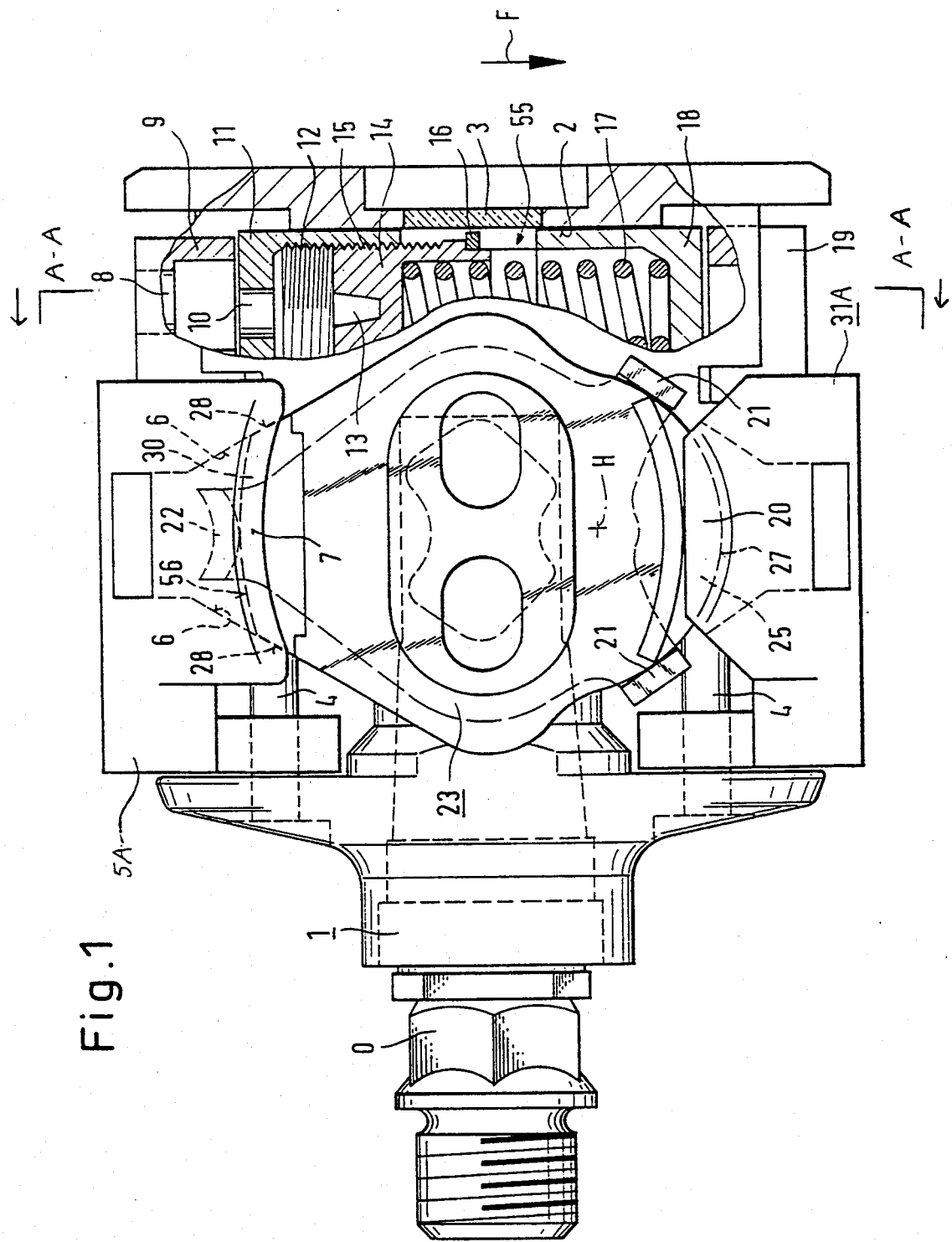
FIG. 1 a schematic and partially cut-out representation of a bicycle pedal with a plate applied thereon, which plate is normally connected to the sole of a shoe, the shoe being not represented, FIG. 2 a longitudinal cross-section of the arrangement shown in FIG. 1, along the line A—A taken through the return device arranged between the two end-side levers, the plate being not yet engaged, FIG. 3 a representation similar to FIG. 2 in which the plate is however already partly engaged, FIG. 4 a representation rotated over 180° about a longitudinal axis of the arrangement shown in FIG. 1, in which the plate applied on the opposed main face is slidably pivoted about a vertical axis, FIG. 5 a longitudinal cross-section of the return device, arranged between the two end-side levers, of the arrangement shown in FIG. 4, in which the plate is completely engaged, FIG. 6 a view similar to that of FIG. 4 along the line B—B of a further variant, FIGS. 7A and 7B a side view and a top view of the plate used in connection with the variant of FIGS. 1 to 5, and FIG. 8 a representation similar to FIG. 1 of a further embodiment comprising two rear abutments.

As it can be better seen in FIGS. 2 and 3, the front and rear anchor members 31, 5 which are arranged at a respective end of the pedal body 1 and are provided on the different main faces A, B, are each formed by a common double-armed lever 5, 31 having an upper and a lower hook-like extension, which is pivotally journalled on the base body about the respective transverse axis 4 (see FIG. 1).

The two double-armed levers 5A, 31A and 31B, 5 are connected to two cams 9, 19, the cam 9 being associated to the rear anchor member 5 formed by a corresponding lever portion and the cam 19 being associated to the front anchor member formed likewise by a lever portion. These cams 9, 19 which extend laterally from the anchor members 5, 31 are urged by a return device 55 arranged between them (see in particular FIGS. 1 to 3).

This return device 55 acting between the two double-armed levers 5, 31 comprises two pistons 11, 18 guided in a bore 2 of the pedal body 1 and a pressure spring 17 arranged between these pistons 11, 18. The piston 11 is held by this pressure spring 17 against the cams 9, 19 of the double-armed lever 5A, 31A provided at one end, whereas the other piston 18 is correspondingly maintained against the cams 9, 19 of the double-armed lever 5A, 31A provided at the other end of the pedal body 1 (see for example FIG. 2).

The return force applied by this return device 55 is adjustable by means of an adjustment screw 14 which is connected to the piston 11 and supports the corresponding end of the pressure spring 17. To that effect, the cup-like piston 11 is provided with an inner thread 12 and the adjustment screw 14 is provided with an outer thread 15, such that the adjustment screw 14, which is likewise realized in a cup-like manner for receiving the corresponding end of the spring, can be telescopically screwed into the piston 12 or out of the latter.

At the exterior of the adjustment screw 15 is mounted an index element 16, which is visible from the exterior through a window 3 provided with a scale, and shows therefore the actually adjusted return force.

A slot 13 for receiving the tip of a screw driver is provided externally in the head of the cup-like adjustment screw 14, and the adjustment screw 14 can be adjusted through this slot 13 as well as through a passage opening 10 in the head of the piston 11, likewise realized in a cup-like manner, and a passage opening 8 in the pedal body 1.

On both main faces A, B of the pedal body 1 are respectively provided two front abutments 21, as considered in the travel direction F. These abutments cooperate with the semicircular front support surface 27 of the plate 23.

Further, on each main face A, B of the pedal body is provided a rear abutment 22, as considered in the travel direction F. This rear abutment cooperates with the curved rear support surface 56 of the plate 23.

In addition, the two flat control surfaces 28 inclined towards each other at the rear portion 30 of the plate 23 cooperate with correspondingly inclined control surfaces 6 of the rear anchor member 5.

Thus, if the plate 23 is pivoted relative to the pedal body 1 about a vertical axis H defined by the semicircular front support surface 27, the support surfaces 28 of the plate 23 are displaced along the support surfaces 6 of the lever-like rear anchor member 5, whereby the latter is pivoted about the pivot axis 4 against the return force applied by the return device 55.

As apparent in particular in FIGS. 1 and 2, the lever-like, hook-like extended anchor members 5, 31 are provided at the upper end of the respective hook-like extension with an inclined control surface 30, or 20 respectively, which facilitates the application of the plate 23 when the associated lever is simultaneously rearwardly pivoted.

Whereas the front abutments 21 are arranged laterally on the front anchor member 31, the rear abutment 22 lies below the hook-like extension of the corresponding rear, lever-like anchor member 5.

The operation of this variant described in connection with FIGS. 1 to 4 and 7 is as follows:

The two identical, expediently made of wear-resistant material, front abutments 21 and the rear abutment 22 fix the plate 23 in the longitudinal direction. The plate 23 is held against the considered main face A, B by means of hook-like extensions of the anchor members which are each formed by a lever. The engagement surfaces are so designed and arranged that the considered lever is not pivoted in case of a pulling load.

The shoe can be automatically connected at will with the one or the other main face of the bicycle pedal via the plate secured to its sole. The shoe or the plate can be applied onto the pedal for example in accordance with the two following possibilities:

In accordance with FIG. 3, it can be achieved, for example by a forward displacement of the foot, that the front nose or the front portion engages into the region below the front lever, until the front semicircular support surface 27 of the plate comes into contact with the front abutments 21.

The same front abutments 21 also serve to guide the plate until it reaches the desired position. For example, if the plate is not exactly aligned with the longitudinal axis of the pedal, the abutments 21 and the front support surface 27 of the plate ensure that the plate is again centered in the longitudinal direction.

Thereafter, if a force FF is exerted in the direction of the ground, the plate comes into engagement with the lever-like rear anchor member 5, and the control surfaces 29 and 7 ensure that the left lever is pivoted towards the left (see FIG. 3). The outer edge of the considered cam comes then into engagement with the piston 11 of the return device 55, whereby the spring 17 is compressed and a corresponding return force is generated.

After the control surface 29 of the plate 23 has completely swept the control surface 7 of the lever-like anchor member 5, the plate occupies its desired position, whereafter the lever-like rear anchor member 5 snaps back under the action of the spring 17 and holds the plate against the considered main face A.

In addition, during this closing movement, the control surfaces 6 of the rear lever cooperate with the control surfaces 28 of the plate, whereby an ideal centering of the plate with respect to the pedal is achieved.

An other manner to climb into the pedal or to apply the plate on the pedal consists in guiding the plate vertically over the pedal and to bring-the rear portion of the plate below the rear lever, or the rear anchor member 5, by a slight rearward displacement in the longitudinal direction, and indeed until it comes into contact with the rear abutment 22.

Thereafter, the front portion of the plate is pressed towards the ground, whereby the return pivoting of the lever is facilitated by means of the control surfaces 26 on the plate and the control surfaces 20 on the front lever or the front anchor member 31.

When the plate is firmly anchored in the pedal, the forwardly directed forces are taken by the front abutments 21, the rearwardly directed forces are taken by the rear abutment 22 and the friction forces acting in the sense of a vertical pulling are taken by the rear and front noses 25 and 30 of the plate and by the front and rear levers.

In case of forces acting in the direction of the rotation axis 0, the front abutments 21 and the supporting surface 27 cause a rotation of the plate, whereby the rear lever is pivoted about its axis 4 owing to the control surfaces 28 of the plate and the control surfaces 6 of the rear lever. The pressure spring 17 is compressed by means of the piston 11 and the adjustment screw 14 via the cam 9 associated to this rear lever. Accordingly, a return force is generated which acts against the forces acting in the direction of the rotation axis 0.

For reduced forces, no displacement of the lever occurs. For stronger forces, the lever is pivoted against the spring force as far as the plate is released and the shoe is therefore freed out.

The return force can be adjusted by means of the adjustment screw 14 such that an undesired release is excluded.

For stepping out of the pedal, the foot and thus the plate is pivoted outwardly or inwardly.

Under the action of the foot, the plate pivots about the vertical axis H defined by the semicircular supporting surface (see FIG. 1). The control surfaces 28 of the plate, which cooperate with the control surfaces 6 of the rear lever, additionally produce a pivoting of the lever 5 about its transverse axis 4. The cam 9 of this lever comes into engagement with the piston 11, by means of which the pressure spring 17 is again compressed via the adjustment screw 15.

The cyclist must thus exert a sufficiently high rotation torque to ensure a compression of the pressure spring 17, and indeed up to such an extent that the rear control surfaces 28 of the plate are totally freed from the control surfaces 6 of the rear lever. From this time on the plate and thus the shoe are totally liberated.

During the course of this release, if a force component occurs rearwardly in the longitudinal direction, this force component is taken by the rear abutment 22.

The release characteristic is correspondingly adjustable by means of the adjustment screw 14 of the return device 55.

The adjustment occurs simultaneously and commonly for the two main faces of the pedal which serve as stepping surfaces.

Figure 5:
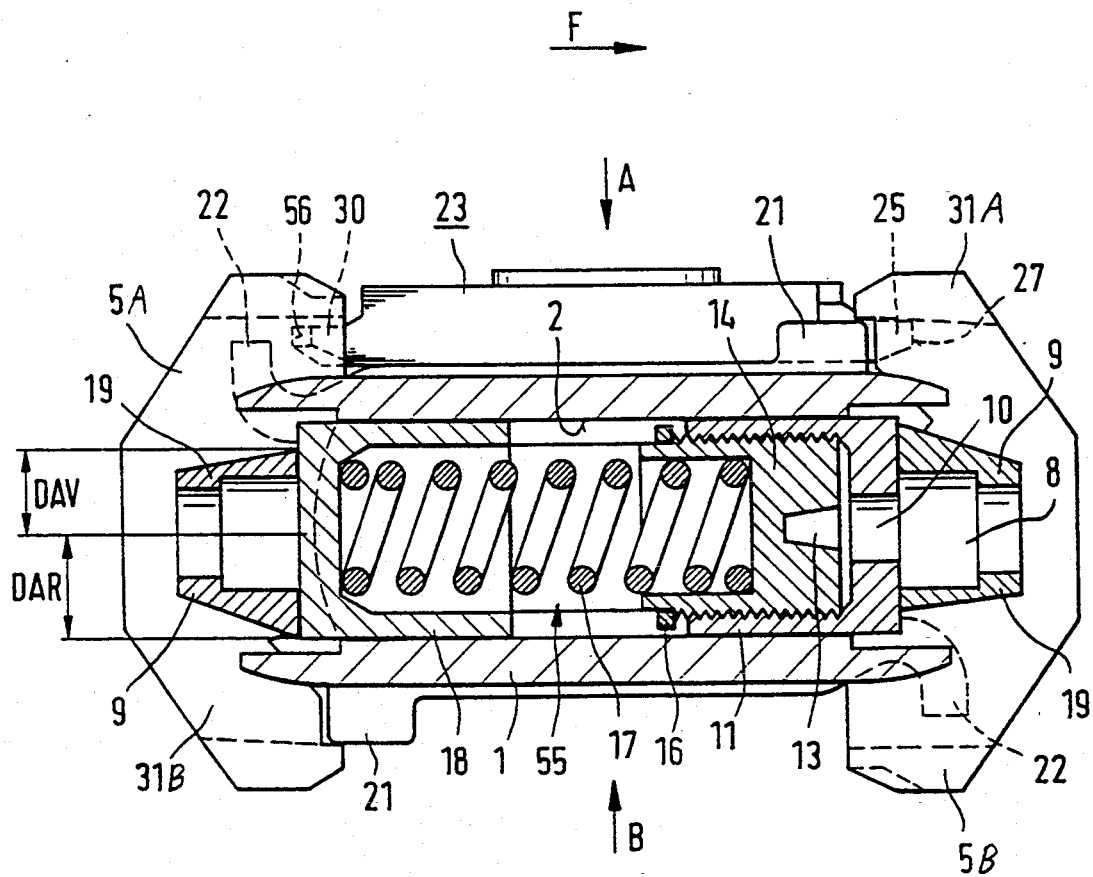

The example of embodiment shown in FIG. 5 of a device for securing a shoe on a bicycle pedal differs from the example of embodiment described hereinabove in that the front and rear anchor members 31, 5, or the front and rear levers which form these anchor members, are urged by means of cams 19, 9 of different profiles. As it can be taken from FIG. 5, the profiles of these cams 19, 9 are selected differently such that when the return device 55 is actuated, a lever arm DAV appears at the cam 19 associated with the front anchor member 31, which is shorter than the lever arm DAR in the case of an engagement of the return device 55 on the cam 9 associated to the rear anchor member 5. What is decisive here is the outer edge of the cam, with which the corresponding piston 18 or 11 comes into engagement (see also FIG. 3).

By means of the different profiles of the cams 19, 9, it is thus achieved that with the use of one and the same return device, the return force is lower for the front anchor member than for the rear anchor member. This facilitates a climbing into the pedal in which the front anchor lever is firstly outwardly pivoted on applying the shoe, before this lever snaps back again for anchoring the plate.

It is here important that the actual release characteristic, or the torque to be applied for the release, is not at all influenced.

Independently of the different cam profiles, this variant of embodiment is comparable to the previously described one. The parts which correspond to each other are therefore designated by the same references.

Figure 6:
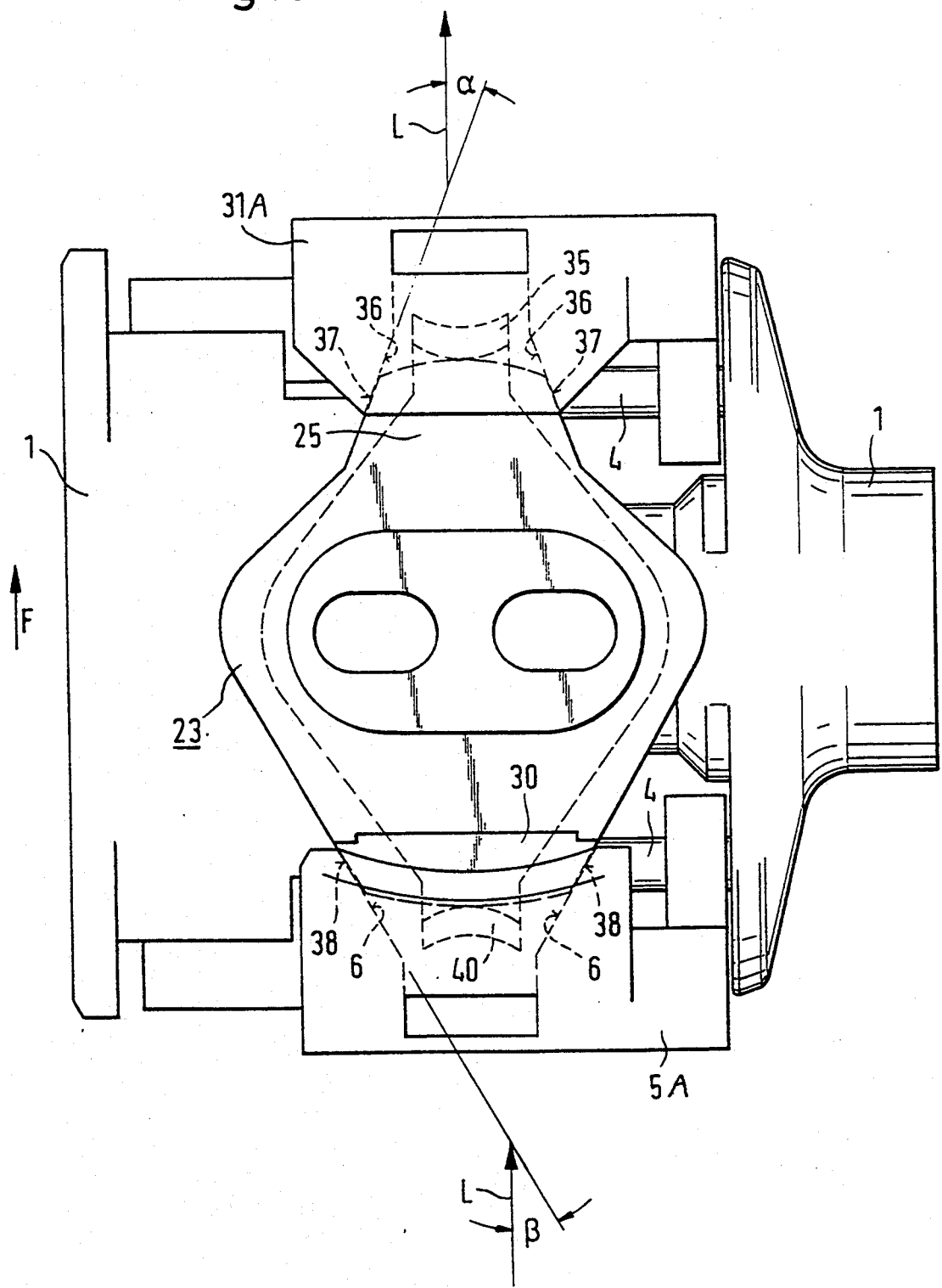

In the example of embodiment shown in FIG. 6, both the front and rear portions 25, 30 of the plate 23 to be secured to the pedal body 1 are provided each with two flat control surfaces 37, 38 inclined towards each other. These control surfaces 37, 38 of the plate 23 cooperate with correspondingly inclined control surfaces 36, 6 of the front or rear lever-like anchor member 31, 5.

The rear portion of the plate 23 as well as the rear lever 5 are thus realized identically to the example of embodiment described in connection with FIGS. 1 to 4 and 7. A rear abutment 40 is also provided.

As a difference however, the front portion 25 of the plate 23 and the front lever 31 have a design similar to the arrangement in the rear region. Correspondingly, only one single front abutment 35 is provided.

The front and rear regions differ in that the front control surfaces 37, 36 are inclined at an angle $\alpha$ with respect to the longitudinal direction L, which is lower than the corresponding angle $\beta$ for the rear control surfaces 38, 6.

It is thereby achieved that for a rotation of the plate 23 caused by example by a corresponding rotation of the foot, the rear lever 5 is pivoted more rapidly about its transverse axis 4 than the front lever 31. Therefore, the plate is released at the back also in this case. The previous release characteristic is maintained.

This variant of embodiment is remarkable by its particularly simple construction, in which only one single abutment 35 is provided at the front, which can be realized in the same manner as the rear abutment 40. As illustrated in broken lines, the two abutments can be bent from a one-piece part. This also applies to the other variants.

Figure 8:
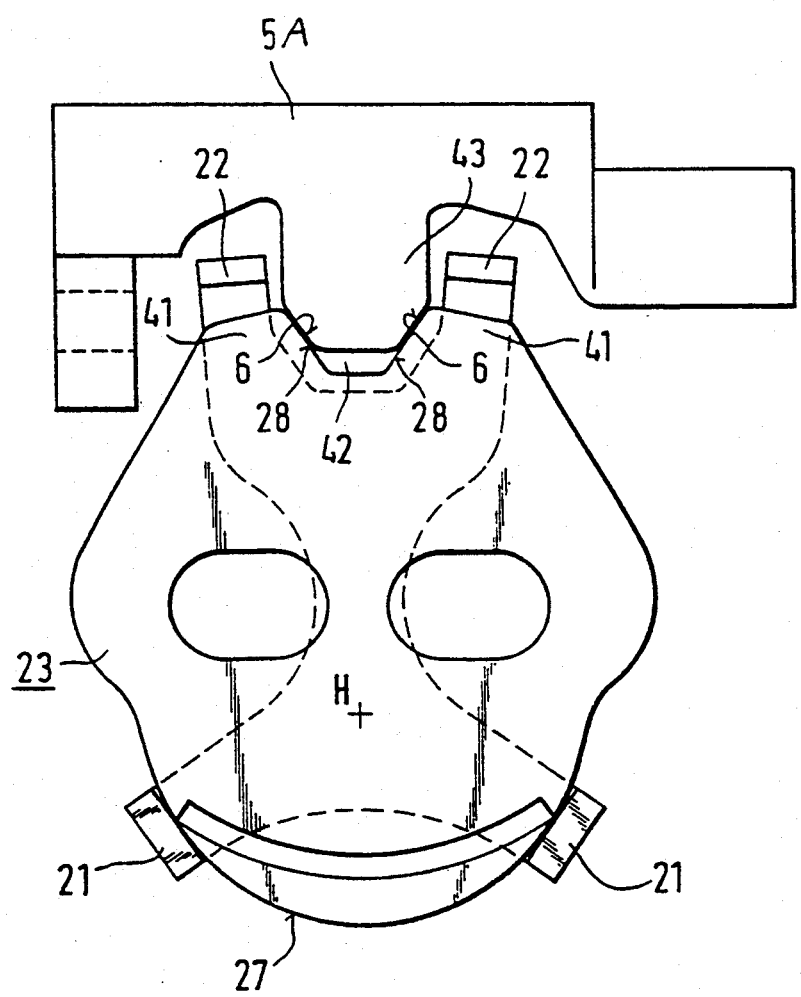

A further variant which facilitates in particular the engagement when the shoes are very dirty or covered with mud is shown in FIG. 8.

In this case, at least two front abutments 21 which cooperate with a semicircular front support surface 27 of the plate 23 are again provided on each of the two main surfaces A, B of the pedal body 1. Insofar, this embodiment still coincides with the embodiments of FIGS. 1 and 7.

As a difference with respect to the above described variants, two rear abutments 22 which cooperate each with a respective one of two rear projections 41 of the plate 23, arranged in a V-shaped manner, are provided on the two main faces A, B. The cut-out 42 which results between the two rear projections 41 is limited laterally by two control surfaces 28 of the plate 23, which control surfaces are inclined towards each other and extend rearwardly away from each other in a V-shaped manner. These control surfaces 28 at the plate side cooperate with correspondingly inclined control surfaces 6 of the rear anchor member 5 which are provided at the exterior on a projection 43 of the rear lever 5 which projects into the cut-out 42.

In this case, on a return by means of the spring, the rear anchor member penetrates via the projection 43 relatively far into the recess 42 formed in the plate 23, which substantially facilitates the climbing in, in particular with very dirty shoes.

We claim:

1. A device for attaching a shoe to a bicycle pedal comprising:
 a plate adapted for mounting onto the shoe, the plate having front and rear portions; and
 a pedal body comprising:

first and second stepping surfaces on opposing sides of the pedal body;

front and rear anchor members disposed on each stepping surface, the front and rear anchor members adapted to cooperate with the front and rear portions of the plate, respectively, the rear anchor members each having a lever that is pivotable about a transverse axis from an anchor position, in which the rear anchor members are configured to affix the plate to the stepping surfaces, and a release position, in which the rear anchor members are configured to release the plate; and means for biasing the levers towards the anchor position, the biasing means including first and second pistons in the pedal body and a pressure spring disposed between the pistons.

2. The device of claim 1 wherein the biasing means creates a single adjustable biasing force that operates simultaneously on both levers.

3. The device of claim 2 further including a screw connected to one of the pistons and supporting an end of the pressure spring, the screw being adapted to adjust the biasing force.

4. A pedal for attaching a shoe thereto, the pedal having a pedal body comprising:

first and second stepping surfaces on opposing sides of the pedal body;

first and second anchor members adapted for attaching the shoe to the first stepping surface;

third and fourth anchor members adapted for attaching the shoe to the second stepping surface;

the first and third anchor members being movable between a anchor position, in which said anchor members are configured to affix the shoe to the stepping surfaces, and a release position, in which said anchor members are configured to release the shoe, the first and third anchor members being disposed substantially diagonally across the pedal body; and a common return device for biasing the first and third anchor members towards the anchor position.

5. The pedal of claim 4 wherein the first and third anchor members are each journalled about a transverse axis with respect to the pedal body.

6. The pedal of claim 4 wherein the return device comprises first and second pistons in the pedal body and a pressure spring disposed between the pistons, the pistons biasing the first and third anchor members toward the anchor position.

7. The pedal of claim 4 wherein the return device creates a single adjustable biasing force that operates simultaneously on both levers.

8. The pedal of claim 7 further including an adjustment screw, coupled to one of the pistons, adapted to adjust the biasing force of the return device.

9. The pedal of claim 4 wherein the second and fourth anchor members are journalled on the pedal body about the transverse axis and biased towards a second anchor position by the return device.

10. The pedal of claim 9 wherein the first, second, third and fourth anchor members are integrally formed into a double armed lever mounted on the first and second stepping surfaces of the pedal body.

11. A pedal for attaching a shoe thereto, the pedal having a pedal body with upper and lower stepping surfaces, the pedal body comprising:

front and rear anchor members disposed on each stepping surface, the rear anchor members each having a lever that is pivotable about a transverse axis from an anchor position, in which the rear anchor members are configured to affix the shoe to the stepping surfaces, and a release position, in which the rear anchor members are configured to release the shoe, the levers each having a camming surface; and means for biasing the levers into the anchor position, the biasing means extending through the pedal body between the levers to frictionally engage the camming surfaces of both levers.

12. The pedal of claim 11 wherein the levers are disposed on first and second ends of the pedal body, the biasing means creating an outwardly directed force towards both levers.

13. The pedal of claim 11 wherein the front and rear anchor members have control surfaces adapted to cooperate with front and rear portions of a plate.

* * * * *